United States Patent Office 3,329,662
Patented July 4, 1967

3,329,662
PREPARATION OF SULFUR-VULCANIZABLE OLEFIN COPOLYMER ELASTOMERS
Harold E. De La Mare, El Cerrito, Calif., assignor to Shell Oil Company, New York, N.Y., a corporation of Delaware
No Drawing. Filed July 16, 1964, Ser. No. 383,212
9 Claims. (Cl. 260—88.2)

This invention relates to the preparation of sulfur-vulcanizable elastomers of alpha olefins. More particularly, it relates to methods for limited dehydrogenation of elastomer copolymers and monoolefins.

The literature describes processes for the production of synthetic elastomers by the copolymerization of mono-alpha olefins having up to 6 carbon atoms. The resulting copolymers are true copolymers as distinguished from physical mixtures of homopolymers. Furthermore, many of the copolymers are characterized as being normally amorphous, which on stretching, crystallize. The crystallizable feature of the elastomers indicates that they are useful after vulcanization or curing as synthetic rubbers.

Methods have been suggested for altering the structure of alpha olefin copolymers to make them vulcanizable, such as by copolymerizing with the original mixture of alpha olefin monomers a third monomer of the diene type such as dicyclopentadiene and the like. Other methods of curing alpha olefin copolymers have been suggested including the vulcanization system of a peroxide with sulfur. This latter procedure, however, results in a cured product having an extremely offensive odor. Moreover, it does not readily adapt itself to the vulcanization of other rubbers with which the alpha olefin copolymers may be combined. The subject copolymers are particularly useful for admixture with diene rubbers only when the usual sulfur vulcanizing agents (including the usual range of sulfur-containing vulcanizing agents) may be utilized for vulcanization of the entire mixture. Up to the present time, procedures for altering alpha olefin copolymers other than by terpolymerization with a diene have not proved entirely adequate.

It is an object of the present invention to provide a novel method for the preparation of sulfur vulcanizable elastomeric copolymers of monoalpha olefins. It is a particular object of the invention to provide a novel method for the limited dehydrogenation of such copolymers to convert them to sulfur vulcanizable products. Other objects will become apparent during the following detailed description of the invention.

Now, in accordance with the present invention, a process is provided for the preparation of sulfur-vulcanizable elastomeric copolymers of monoalpha olefins which comprises heating said copolymers dissolved in a non-hydrogen-donating solvent (e.g., an essentially inert solvent) with a mixture of a copper compound of the group consisting of copper halides and copper carboxylates and certain organic peroxides as more fully described hereinafter, the molar ratio of peroxide to copper compound being between about 2 and 50, the mixture being heated at a temperature between about 25° C. and 100° C. for 1-24 hours, and thereafter recovering the sulfur-vulcanizable elastomeric dehydrogenation product having an iodine number between about 5 and 50, preferably 7–35 g. $I_2$/100 g. polymer.

In the description wherein reference is made to "elastomeric copolymers of mono-olefins" or words of similar meaning, it is to be understood that reference is made to copolymers of at least two olefins of the formula:

$$CH_2=CHR$$

wherein R is hydrogen in one of the monomers and is an alkyl radical in any other monomers present up to four carbon atoms. Representative monoolefins include, ethylene, propylene, butene-1, pentene-1, hexene-1, 4-methylpentene-1, and the like. Representative elastomeric copolymers include ethylene-propylene, ethylene-butene-1 ethylene-pentene-1, propylene-hexene-1, and the like. For simplicity and because the present invention applies equally to elastomeric copolymers of the type described above, the invention will be described mainly as it relates to ethylene-propylene elastomers.

For the most part, such elastomers contain from about 10 to 90% mols of alpha olefins having from 3 to 6 carbon atoms per molecule, the balance being condensed ethylene units. The products are substantially saturated, i.e., have an iodine number no more than about 3.5. Because of this, they cannot be vulcanized by the use of the usual sulfur vulcanizing recipes.

While the process of preparing the subject block copolymers does not form a part of the present invention, the following brief description of suitable processes are typical of those by which the desired types of elastomeric copolymers may be formed:

A mixture of the monomers is polymerized in the presence of an inert hydrocarbon solvent with a catalyst which comprises the reaction product of a metallo-alkyl compound of Groups I, II or III and a compound of a metal halide such as vanadium chloride or vanadium oxychloride. The ratio of monomers, as ethylene to propylene, that is maintained during the polymerization will vary depending upon the proportion of the respective monomers desired in the final elastomer. This in turn will vary depending upon the ultimate formulation desired in the vulcanizate. In any case, in the preferred embodiments, the elastomer may contain from 60 mol percent to about 80 mol percent of ethylene units to form the optimum elastomeric copolymer. Because the monomers do not polymerize at the same rate, i.e., ethylene polymerizing faster than propylene for example, the ratio of the starting mixture of the monomers is not the same as that desired in the final product. This may be one of the major considerations in selecting the starting monomer ratios to give a particular final product.

Other considerations are the choice of catalyst components and their respective proportions, as well as the polymerization conditions. By way of illustration, when operating at 45–65° C. and normal heptane solvent with a catalyst comprising the reaction product of trihexyl aluminum and vanadium oxychloride in the mol ratio of 3:1, the starting mixture should contain between about 30 and 50 mol percent of ethylene if the desired condensed ethylene content in the copolymer is to be between about 60 and 80 mol percent. Other suitable alkyl aluminum compounds as catalyst components include trioctyl aluminum, trinonyl aluminum, tridecyl aluminum, triisobutyl aluminum and the like. Preferably, the alkyl radicals of the trialkyl aluminum have more than 4 carbon atoms but not more than about 16 carbon atoms.

The ratio of the aluminum compounds to the vanadium oxychloride or vanadium tetrachloride may vary widely but preferably the aluminum to vanadium mol ratios is greater than about 2. The catalyst is simply prepared by mixing and reacting the catalyst components in the hydrocarbon solvent whereupon a catalytic reaction product is formed. The suitable products usually have intrinsic viscosities in the order of 2.0 to 8.0, more particularly between about 2.5 and 6.5 (measured in cyclohexane at 25° C.). The copolymers may not only be those formed between ethylene and one other higher monoalpha olefin but also may be copolymers of ethylene with more than one monoalpha olefin such as a mixture of propylene and butylene.

The subject process of the present invention provides a convenient and economical means for the controlled dehydrogenation of the essentially saturated monoolefin copolymers to provide sufficient double bonds for vulcanization or curing with the usual sulfur containing vulcanization recipe. Ether in the presence or absence of other vulcanizable rubbers such as styrene-butadiene copolymers or conjugated diene homopolymers such as polybutadiene or polyisoprene and the like as well as natural rubber.

Another of the essential requirements in successfully carrying out the process of the invention is that the solvent for the elastomeric copolymer be essentially inert under the conditions of the reaction, i.e., a non-hydrogen-donating liquid either an aromatic or haloaromatic hydrocarbon or a perhalo alkane or alkene. Suitable solvents for use in the present invention include particularly benzene, perchloroethylene, perchloropropylene, naphthalene, chlorobenzene, bromobenzene, dichlorobenzene, t-butylbenzene, chloronaphthalenes and mixtures thereof.

The combination of agents required by the process of the present invention for the controlled dehydrogenation of the subject alpha olefin copolymers comprise certain peroxides and copper compounds. Five principal classes of peroxides are contemplated falling within the generic structural formula as follows:

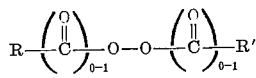

In the above formula, R is a hydrocarbyl radical and R' is a radical of the group consisting of hydrogen and hydrocarbyl. The five principal classes meeting the above structural formula include peresters, hydroperoxides, peracids, dialkylperoxides and diacylperoxides. The following species are typical of these various classes of peroxides:

*Peresters* t-butyl perbenzoate              sec-butyl perpropionate
t-butyl peracetate               isopropyl perbutyrate
sec-butyl perbenzoate

*Hydroperoxides* t-butyl hydroperoxide            sec-hexyl hydroperoxide
n-propyl hydroperoxide           n-octyl hydroperoxide
sec-amyl hydroperoxide

*Peracids* peracetic acid                   per-t-butyric acid
perpropionate acid               perstearic acid
perbenzoic acid

*Dialkyl peroxides* di(n-butyl)peroxide              n-butyl-t-butyl peroxide
di(t-butyl)peroxide              isopropyl-t-butyl peroxide
di(t-amyl)peroxide

*Diacyl peroxides* dibenzoyl peroxide               mixed di($C_{9-15}$ acyl) peroxides
dipropionyl peroxide The preferred classes meeting the above general formula are: peresters, particularly tertiary butyl perbenzoate, and alkyl hydroperoxides, particularly tertiary-butyl hydroperoxide. The peroxides should be employed in an amount dependent in part upon their ease of degradation but usually will be utilized in an amount between about 25 and 1500 millimoles of peroxide per 1000 grams of olefin copolymer.

The copper compounds utilized as the co-catalysts in the subject dehydrogenation process include both insoluble classes such as cuprous or cupric halides on the one hand and soluble copper compounds such as cupric or cuprous carboxylates on the other. The presence of small proportions of lower fatty acids, e.g., acetic acids, facilitates solution of some of the copper salts in the reaction medium. Typical copper compounds within each of these classes are given in the following list:

*Copper halides* cuprous bromide                  cupric bromide
cuprous chloride                 cupric chloride
cuprous iodide

*Copper carboxylates* cupric salts of mixed $C_{9-15}$ branched chain aliphatic carboxylic acids
cupric p-(t-butyl)benzoate
cupric acetate
cupric naphthenate
cupric t-butyrate The proportion of copper compounds utilized in the subject process is related to the amount of peroxide present, the molar ratio of peroxide to copper compound being between about 2 and 50, preferably between about 10 and 30.

The process of the invention is carried out at temperatures which will vary primarily with the stability of the peroxide involved. This will in turn depend upon the stability of the peroxide in the presence of the other compenents of the reaction mixture, principally the copper compounds. Within the temperature range of 25–100° C., the dehydrogenation will require from about 1 to about 24 hours. However, with many of the more suitable peroxides, it is more profitable to employ a temperature range between about 50° C. and 85 C. for a period of time between about 2 and 12 hours.

One of the essential requirements of the subject process of the invention is that it be carried out in the substantial absence of elemental oxygen ($O_2$) since the presence of oxygen causes undesirable side reactions to occur which do not result in dehydrogenation of the copolymers being treated. Consequently, the dehydrogenation treatment is to be carried out either in vacuum or in the presence of essentially inert gases such as argon, nitrogen, etc. In the event that the solvent utilized for dissolving the copolymer is boiling, the space above the reaction mixture may be filled with a blanket of the vaporized solvent such as vaporized benzene, thus protecting the mixture from contamination by air.

At the conclusion of the dehydrogenation process, the product comprises a solution of the partially dehydrogenated olefin copolymer in the inert solvent. This cement may be utilized as such but it is normally preferred to isolate and recover the treated olefin copolymer and, if desired, treat it by washing or dialysis to remove any desired portion of contaminating salts such as copper or peroxide residues.

The product of the reaction will be found to comprise the olefin copolymer virtually unaltered except with respect to a limited change in the iodine number which is between about 5 and 50, preferably between about 7.5 and 25. The oxygen content of the products is insignificant being no more than 0.1–0.2% by weight.

The iodine number is expressed and determined in accordance with the paper by Kemp and Peters, Industrial and Engineering Chemistry Analytical Edition, 15, 453 (1943), involving a determination of iodine number in terms of grams of iodine released from iodine chloride per 100 grams of polymer in a chlorinated benzene medium.

The product of the process being claimed is immediately suitable for use in a vulcanization procedure involving a sulfur containing vulcanizing agent which may be sulfur itself, various mercaptans or sulfur halides, etc. The process of the present invention is particularly striking in that within the limits of the process conditions described and, recognizing differences which may be adjusted dependent upon the specific components of the reaction mixture, e.g., the decomposition temperature of the peroxide and the activity of the copper salt, the limited degree of dehydrogenation is possible without materially effecting the average molecular weight of the product. On the other hand, it may be desirable at times to actually cause a deliberate reduction in the molecular weight of the product and with this in mind, the conditions of the temperature relative to dehydrogenation catalyst components and duration of the treatment may be adjusted to cause a regulated amount of chain cission. Usually, however, it is preferred to avoid this.

Aromatic solvents (including halogenated aromatics) are preferred in compraison to the perhaloalkanes if it is desired to avoid marked chain degradation.

The following examples illustrate the process of the present invention. An elastomeric ethylene-propylene copolymer containing 50–51 mol percent of ethylene and having an intrinsic viscosity of 3.77 and an iodine number of 2.7 was utilized for these comparative experiments. a two percent solution of the copolymer in benzene was employed in each run, 75 grams of the solution being utilized. In each case, the reaction mixture was heated for seven hours at 80° C. under a blanket of nitrogen. The table which follows gives details of the peroxide and copper catalysts utilized as well as the iodine number of the recovered products.

Dehydrogenation of Ethylene-Propylene Polymers

| Run | t-Butyl Perbenzoate (mmoles) | Cu (mmoles) | Recovered Polymer $I_2$ No. (g./100g.) |
|---|---|---|---|
| A | 8 | CuBr, 4 | 10 |
| B | 1 | CuBr, 0.1 | 9 |
| C | 0.5 | CuBr, 0.06 | 6 |
| D | 2 | Cu(t-BBenz)$_2$,[a] 1 | 11 |
| E | 1 | Cu(t-BBenz)$_2$, 0.1 | 10 |
| F | 0.5 | Cu(t-BBenz)$_2$, 0.05 | 5 |
| G | 2 | Cu(t-BBenz)$_2$,[a] 0.1 | 8 |
| H | 2 | Cu(t-BBenz)$_2$, 1 | 10 |
| I | 1 | Cu(t-BBenz)$_2$, 1 | 5 |
| J | 2 | Cu(C] Acid)$_2$, 0.1 | 12 |
| K | 1 | ----do---- | 8 |
| L | 1 | Cu(C Acid)$^2$, 0.05 | 9 |
| M | 5 | Cu(C Acid)$^2$, 0.25 | 13 |
| N | 2 | Cu(C Acid)$^2$, 0.07 | 8 |
| O | 2 | Cu(C Acid)$^2$, 0.05 | 7 |

[a] Copper salt of p-(t-butyl)benzoic acid.

It was found that the treated products prepared as described above were vulcanizable with standard vulcanization recipes containing sulfur vulcanizing agents.

I claim as my invention:

1. The process for the preparation of sulfur-vulcanizable elastomers which comprises:
   (a) forming a solution of a substantially saturated elastomeric copolymer of ethylene and at least one alpha olefin having from 3 to 6 carbon atoms per molecule in a non-hydrogen-donating solvent;
   (b) admixing the solution with a peroxide of the general configuration:

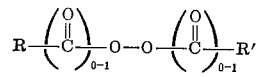

wherein R is a hydrocarbon radical and R′ is a radical of the group consisting of hydrogen and hydrocarbyl, and a copper compound of the group consisting of copper halides and copper carboxylates, the molar ratio of peroxide to copper compound being between about 2 and 50;
   (c) heating the mixture so formed in the substantial absence of elemental oxygen at a temperature between about 25° C. and about 100° C. for 1–2 hours;
   (d) and recovering sulfur vulcanizable elastromeric dehydrogenation product having an iodine number between 5 and 50.

2. A process according to claim 1 wherein the peroxide is an alkyl hydroperoxide.

3. A process according to claim 1 wherein the copper halide is cuprous bromide.

4. A process according to claim 1 wherein the peroxide is an alkyl ester of a fatty peracid.

5. A process according to claim 1 wherein the solvent is an aromatic hydrocarbon.

6. A process according to claim 1 wherein the copper carboxylate is a cupric salt of a carboxy alkane.

7. A process according to claim 1 wherein the heating temperature is between about 50° C. and 85° C. for 2–12 hours.

8. The process for the preparation of sulfur-vulcanizable elastomers which comprises:
   (a) forming a benzene solution of a substantially saturated elastomeric ethylene-propylene copolymer containing from 10 to 90 mol percent condensed ethylene units;
   (b) admixing the solution with tert-butyl perbenzoate and the cupric salt of p(t-butyl)benzoic acid, the perbenzoate and salt being present in a molar ratio between 10:1 and 2:1;
   (c) heating the mixture so formed at reflux for 2–12 hours;
   (d) and recovering a sulfur-vulcanizable elastomeric dehydrogenated ethylene-propylene copolymer product having an iodine number of 7.5–25.

9. The process for the preparation of sulfur-vulcanizable elastomers which comprises:
   (a) forming a benzene solution of a substantially saturated elastomeric ethylene-propylene copolymer containing from 40 to 80 mol percent condensed ethylene units;
   (b) admixing the solution with tert-butyl perbenzoate and cuprous bromide the perbenzoate and salt being present in a molar ratio between 10:1 and 2:1;
   (c) heating the mixture so formed at reflux for 2–12 hours;
   (d) and recovering a sulfur vulcanizable elastomeric dehydrogenated ethylene-propylene copolymer product having an iodine number of 7.5–25.

No references cited.

JOSEPH L. SCHOFER, *Primary Examiner.*

L. EDELMAN, *Assistant Examiner.*